United States Patent
Ohta et al.

[11] Patent Number: 6,144,624
[45] Date of Patent: Nov. 7, 2000

[54] METHOD AND DEVICE FOR CONTROLLING TRACKING OF OPTICAL MEMORY CARD

[75] Inventors: Michihiro Ohta, Sakado; Hiroaki Yoshida, Hiki-gun, both of Japan

[73] Assignee: Kabushiki Kaisha Nippon Conlux, Tokyo, Japan

[21] Appl. No.: 09/051,765

[22] PCT Filed: Aug. 15, 1997

[86] PCT No.: PCT/JP97/02836

§ 371 Date: Apr. 15, 1998

§ 102(e) Date: Apr. 15, 1998

[87] PCT Pub. No.: WO98/07146

PCT Pub. Date: Feb. 19, 1998

[30] Foreign Application Priority Data

Aug. 15, 1996 [JP] Japan .................................. 8-215741

[51] Int. Cl.⁷ .................................................. G11B 7/00
[52] U.S. Cl. .................................. 369/44.26; 369/275.3
[58] Field of Search .................................. 369/48, 275.3, 369/44.26, 47, 44.34, 275.4, 44.35; 235/454, 494

[56] References Cited

U.S. PATENT DOCUMENTS 5,142,519 8/1992 Horie ........................................ 369/48

FOREIGN PATENT DOCUMENTS

| 6344333 | 2/1988 | Japan | G11B 7/24 |
| 2166673 | 6/1990 | Japan | G11B 20/12 |
| 5120694 | 5/1993 | Japan | G11B 7/00 |

Primary Examiner—Paul W. Huber
Attorney, Agent, or Firm—Hogan & Hartson LLP

[57] ABSTRACT

A method and device for controlling tracking of an optical memory card, which facilitates achieving synchronization together with the detection and correction of track holding mistakes, thus speeding up the operation and preventing overwriting and other problems. Synchronization is achieved, and the detection and correction of track holding mistakes implemented by configuring the guide tracks (2) of the optical memory card with an arrangement of guide track segments (4, 4a, 4b, 4c, 4d), extracting the synchronizing signal from the patterns of the arrangements of the guide tracks as detected by means of photosensors (11, 12), and identifying the data recording tracks (1).

11 Claims, 11 Drawing Sheets

|   | A  | B  | C  | D  | E  |
|---|----|----|----|----|----|
| A | 0  | +1 | +2 | −2 | −1 |
| B | −1 | 0  | +1 | +2 | −2 |
| C | −2 | −1 | 0  | +1 | +2 |
| D | +2 | −2 | −1 | 0  | +1 |
| E | +1 | +2 | −2 | −1 | 0  |

FIG.6

ENLARGED VIEW OF RECORDING AREA

METHOD AND DEVICE FOR CONTROLLING TRACKING OF OPTICAL MEMORY CARD

TECHNICAL FIELD

The present invention relates to a method and device for controlling the tracking of an optical memory card. In particular it relates to a method and device for controlling the tracking of an optical memory card, which is capable of not only speeding up the operations of recording and reproducing in an optical memory card, but also capable of ensuring prevention of overwriting and similar operational errors resulting from mistakes in track holding.

BACKGROUND ART

Generally speaking, optical memory cards are plastic cards of a stipulated size configured in such a manner that their recording area may be recorded on to and reproduced with the aid of a laser beam.

FIG. 10 shows the recording area 102 of a conventional optical memory card 101. As may be seen from the enlarged drawing, the recording area 102 has data recording tracks 1 and guide tracks 2 arranged alternately on it. The data recording tracks 1 are the parts which serve to record data, while the guide tracks 2 are formed at a specified interval, which is required for the purpose of tracking control whereby the irradiation position of the laser beam used for recording and reproducing is stabilized.

Here, the reflection factors of the data recording tracks 1 and the guide tracks 2 differ, and a comparison between the two shows that of the data recording tracks 1 is high, while that of the guide tracks 2 is low.

The recording pits 3 are sections with low reflection factors which are formed by a laser beam within the recording tracks 1 at the time of recording. The presence or absence of these recording pits 3 corresponds to the digital codes 0 and 1.

FIG. 11 is a diagram illustrating the configuration of the optical system which records and reproduces information for the optical memory card 101.

In FIG. 11, a laser beam emitted from a laser diode 103 is rendered into a parallel beam by a collimator lens 104, is incident upon a diffraction grating 105, and is split into innumerable light rays.

The light rays which have been split with the aid of the diffraction grating 105 are directed on to a beam splitter 106, the zero-order beam being used as the main beam for recording and reproducing data, while the ±-order beam is used as a sub-beam for tracking control.

Part of the rays which are incident upon the beam splitter 106 are reflected in a 90° direction and directed on to a power monitor 114 which monitors the strength of the light source. The remaining rays pass through the beam splitter 106 and proceed straight ahead by way of a reflecting mirror 107 and objective lens 108 to converge as three spots on the recording area 102 of the optical memory card 101.

Reflected off the recording area 102, the rays are rendered into a parallel beam once more by the objective lens 108, pass through the reflecting mirror 107, and are reflected in a 90° direction by the beam splitter 106. They then proceed by way of a collimator lens 109 and concave lens 110 to assume a long focal length and be directed on to an edge mirror 111.

This edge mirror 111 is a reflecting mirror which is located so as to screen half the rays, so that they are divided into half the main beam along with the +-order light of the sub-beam on the one hand, and the remaining half of the main beam along with the −-order light of the sub-beam on the other.

Having been divided by means of the edge mirror 111, the half of the main beam and the +-order light of the sub-beam proceed straight ahead to form an image on an photosensor 112, while the remaining half of the main beam and the −-order light of the sub-beam are reflected in a 90° direction to form an image on an photosensor 113.

The rays which form images on the photosensors 112 and 113 are here converted into electric signals.

It should be noted that the main beam (0-order light) 7 and the sub-beams (±-order light) 8a, 8b, having passed through the objective lens 108, are directed on to the recording area 102 as illustrated in FIG. 10. The recording pits 3 are formed by this main beam 7 in the center of the data recording track, which is to say equidistantly from the two adjoining guide tracks 2. For this reason, the main beam 7 must always be directed on to the center of the data recording track 1. Consequently, tracking control is implemented with the aid of the sub-beam 8 (or the sub-beams 8a and 8b) and the guide tracks 2.

The main beam 7 and the sub-beams 8a and 8b are always incident on the recording area 102 at a prescribed interval. When the main beam 7 is incident in the correct position, half of each of the sub-beams 8a and 8b is incident upon the data recording track 1, and the remainder upon the guide track 2.

Inasmuch as the edge mirror 111 causes the reflected light of the two sub-beams 8a and 8b to form images on separate photosensors (e.g. the sub-beam 8a on the photosensor 112, and the sub-beam 8b on the photosensor 113), it is possible to calculate the reflection factor of the positions upon which the respective sub-beams are incident.

If each of the beams 8a and 8b are incident in the correct position, the reflection factors of the positions in which they are incident are equal, as therefore are the respective strengths of the reflected light.

However, if the irradiation position of a beam is displaced to the left or to the right, the difference between the respective strengths of the reflected light of the sub-beams 8a and 8b appears as a positive or negative value. This difference is converted into an electric signal and fed back as a tracking error signal. This drives the objective lens 108 in a horizontal direction, controlling it so that it assumes a state where this tracking error signal is 0, namely where the main beam 7 is incident in the correct position.

FIG. 12 illustrates the logical data configuration of the recording area 102. In the recording area 102 are recorded, apart from a sector 120 which is the part where data is recorded, a lead-in 121 which allows the device for recording and reproducing the optical memory card (not shown in the drawing) to achieve bit synchronization during recording and reproduction, a SYNC mark 122 which facilitates frame synchronization, a BOS 123 which is necessary in order to detect the position at which the sector 120 begins, and other information.

In the lead-in 121, not only is the SYNC mark 122 recorded, but the recording pit 3 is formed for each recording interval (synonymous with the digital code 1 1 1 1 . . . ).

The device for recording and reproducing the optical memory card (not shown in the drawing) has a device for generating a synchronizing signal (not shown in the drawing). The memory card 101 is scanned at a scanning rate such that the synchronizing signal output from the device for generating a synchronizing signal matches the initialization signal of each bit which is detected by scanning the lead-in 121, and bit synchronization is achieved by maintaining this scanning rate.

A modulation system wherein a synchronizing signal is included in the recorded data is sometimes employed in order to ensure that the achieved bit synchronization is maintained, and the synchronizing signal is extracted from the signal detected during reproduction.

Here, the SYNC mark 122 is formed by arranging recording pits 3 in a pattern which is not generated by modulation, and this is used so that the device for recording and reproducing the optical memory card (not shown in the drawing) can acquire the frame signal.

The frames are sequences of bits when the signal processing circuit within the device for recording and reproducing the optical memory card (not shown in the drawing) is processing signals. The device for recording and reproducing the optical memory card (not shown in the drawing) has a counter (not shown in the drawing) for achieving frame synchronization. When it has counted up to the number of bits which constitute a frame, it outputs a frame synchronizing signal and clears the counter value.

Here, the SYNC mark 122 is recorded at the beginning (or end) of the frame. The device for recording and reproducing the optical memory card (not shown in the drawing) scans the optical memory card 101. When it detects the SYNC mark 122, it clears the counter (not shown in the drawing) for achieving frame synchronization, ensuring that frame synchronization is achieved.

When a track holding mistake occurs in the conventional method for controlling the tracking of an optical memory card as described above, and vibration of the actuator or an external shock of some kind causes the main beam while scanning a data recording track 1 to migrate to a different data recording track 1, control is implemented in such a manner that the main beam tracks the center of the recording track 1 to which it has migrated.

In such a case, a problem occurs in that if the track to which the main beam has migrated is a data recording track 1 on which data has already been recorded, the data is overwritten and lost.

In order to prevent the overwriting of data, it is vital to distinguish between a data recording track 1 which has already been recorded and one which has not. It has been suggested that a modulation system might be adopted whereby recording pits 3 are formed within a specified interval even if the data recorded is a succession of 0 signals (not forming recording pits), but efficiency is poor. Moreover, even if this system is adopted, it is difficult to prevent overwriting altogether because it occurs before there is time to detect that the track to which the main beam has migrated is a data recording track 1 on which data has already been recorded.

Meanwhile, conventional devices for recording and reproducing optical memory cards have a circuit for generating a synchronizing signal in order to achieve bit synchronization. They also have an actuator and control circuit whereby it is possible to maintain a constant scanning rate in order to ensure that the bit synchronization achieved by scanning the lead-in 121 is maintained. This means that if the action of recording and reproduction is to be speeded up, it is necessary to improve the accuracy of the scanning rate, including the accuracy of the actuator.

Moreover, not only are the lead-in 121 and SYNC mark 122, which are vital so that the device for recording and reproducing the optical memory card to achieve bit and frame synchronization, recorded on the conventional optical memory card, but a modulation system is adopted whereby a synchronizing signal is included in the data which is recorded for the purpose of ensuring that bit synchronization is maintained. Thus, the adoption of a modulation system such as allows data recording tracks 1 which have already been recorded to be distinguished from those which have not results in problems of lower recording efficiency and a reduction in the amount of data which can be recorded on one optical memory card.

SUMMARY OF THE INVENTION

It is an object of the present invention to provide a method and device for controlling the tracking of an optical memory card which not only make it possible to ensure that overwriting and similar problems arising from track holding mistakes are avoided, but also serve to speed up the actions of recording and reproduction.

With a view to the attainment of the abovementioned object, the present invention provides a method for controlling tracking of an optical memory card having in a recording area alternately data recording tracks for recording data, and guide tracks for guiding a position of a laser beam used for recording and reproduction, the tracking of the optical memory card being implemented on the basis of a detection output of photosensors located in correspondence with the guide tracks, characterized int that the method comprises the steps of: forming on the guide tracks patterns comprised of a combination of at least two types of guide track segment of a prescribed length synchronized with a recording interval in relation to the data recording tracks; and extracting a synchronizing signal for recording and reproduction in relation to the data recording tracks by reading the patterns with the aid of the photosensors.

It may be configured in such a manner that the patterns comprised of the combination of guide track segments of the prescribed length differ in correspondence with each of the data recording tracks, and a track holding error in the data recording tracks is detected on the basis of a read output of the patterns with the aid of the photosensors.

It may also configured in such a manner that the patterns comprised of the combination of guide track segments of the prescribed length differ in correspondence with each of the data recording tracks, and identification of the data recording tracks is carried out on the basis of a read output of the patterns with the aid of the photosensors.

Here, the guide track segments of the prescribed length may comprise first guide track segments which are slightly shorter than n times the recording interval, and second guide segments which are slightly shorter than 2n times the recording interval.

Moreover, the tracking of the optical memory card may be implemented on the basis of a low-frequency component of the photosensor, and extraction of the synchronizing signal and identification of the tracks of the optical memory card are carried out on the basis of a high-frequency component of the photosensor.

Here, the patterns formed on the guide tracks may comprise patterns which are repeated in a cycle below that of the number of bits for which errors can be corrected in relation to the data recording tracks, identification of the data recording tracks is carried out on the basis of combinations of patterns formed on two guide tracks between which the data recording track is interposed.

Also, the invention provides a device for controlling the tracking of an optical memory card having in a recording area alternately data recording tracks for recording data, and guide tracks for guiding a position of a laser beam used for recording and reproduction, wherein patterns are formed on the guide tracks, said patterns being comprised of a combination of at least two types of guide track segment of a prescribed length synchronized with a recording interval in relation to the data recording tracks, and the tracking of the optical memory card is implemented on the basis of detection outputs of a first photosensor and a second photosensor located in correspondence with two guide tracks between which the data recording track is interposed, characterized in that the device comprises:

a first low-band pass filter which serves to extract a low-band frequency component from a detection output of the first photosensor;

a first high-band pass filter which serves to extract a high-band frequency component from the detection output of the first photosensor;

a second low-band pass filter which serves to extract a low-band frequency component from a detection output of the second photosensor;

a second high-band pass filter which serves to extract a high-band frequency component from the detection output of the second photosensor;

tracking control means for carrying out the tracking of the optical memory card on the basis of a difference between the detection output of the first low-band pass filter and that of the second low-band pass filter;

an AND-circuit for extracting a synchronizing signal for recording and reproduction in relation to the data recording track on the basis of a logical product of the detection output of the first high-band pass filter and that of the second high-band pass filter;

a first comparative circuit for comparing the detection output of the first high-band pass filter with a prescribed first reference pattern;

a second comparative circuit for comparing the detection output of the second high-band pass filter with a prescribed second reference pattern; and identification means for identifying the data recording track on the basis of comparative outputs of the first and second comparative circuits.

Here, the configuration may be such that the patterns formed on the guide tracks comprise a combination of first guide track segments being slightly shorter than n times the recording interval and second guide track segments being slightly shorter than 2n times the recording interval, and a combination of the pattern formed in the two guide tracks between which the data recording track is interposed differs at least among adjoining data recording tracks.

Moreover, the configuration may be such that the patterns formed on the guide tracks comprise patterns which are repeated in a cycle below that of the number of bits for which errors can be corrected in relation to the data recording tracks.

Also, the invention is characterized by having in a recording area alternately data recording tracks for recording data and guide tracks for guiding a position of a laser beam used for recording and reproduction, and having on the guide tracks patterns comprised of a combination of at least two types of guide track segment of a prescribed length synchronized with a recording interval in relation to the data recording tracks.

Here, the configuration may be such that the patterns formed on the guide tracks comprise a combination of first guide track segments being slightly shorter than n times the recording interval and second guide track segments being slightly shorter than 2n times the recording interval.

Moreover, the configuration may be such that the combination of patterns formed on the two guide tracks between which the data recording track is interposed differs at least among adjoining data recording tracks.

Furthermore, the configuration may be such that the patterns formed on the guide tracks comprise patterns which are repeated in a cycle below that of the number of bits for which errors can be corrected in relation to the data recording tracks.

BRIEF DESCRIPTION OF THE DRAWINGS

FIG. 6 is a drawing which illustrates the method of signal processing within a computing unit in the circuit configuration depicted in FIG. 3;

BEST MODE FOR CARRYING OUT THE INVENTION

There follows an embodiment whereby the optical memory card and device for that purpose to which the present invention pertains will be described in greater detail with the aid of the attached drawings.

Figure 1:
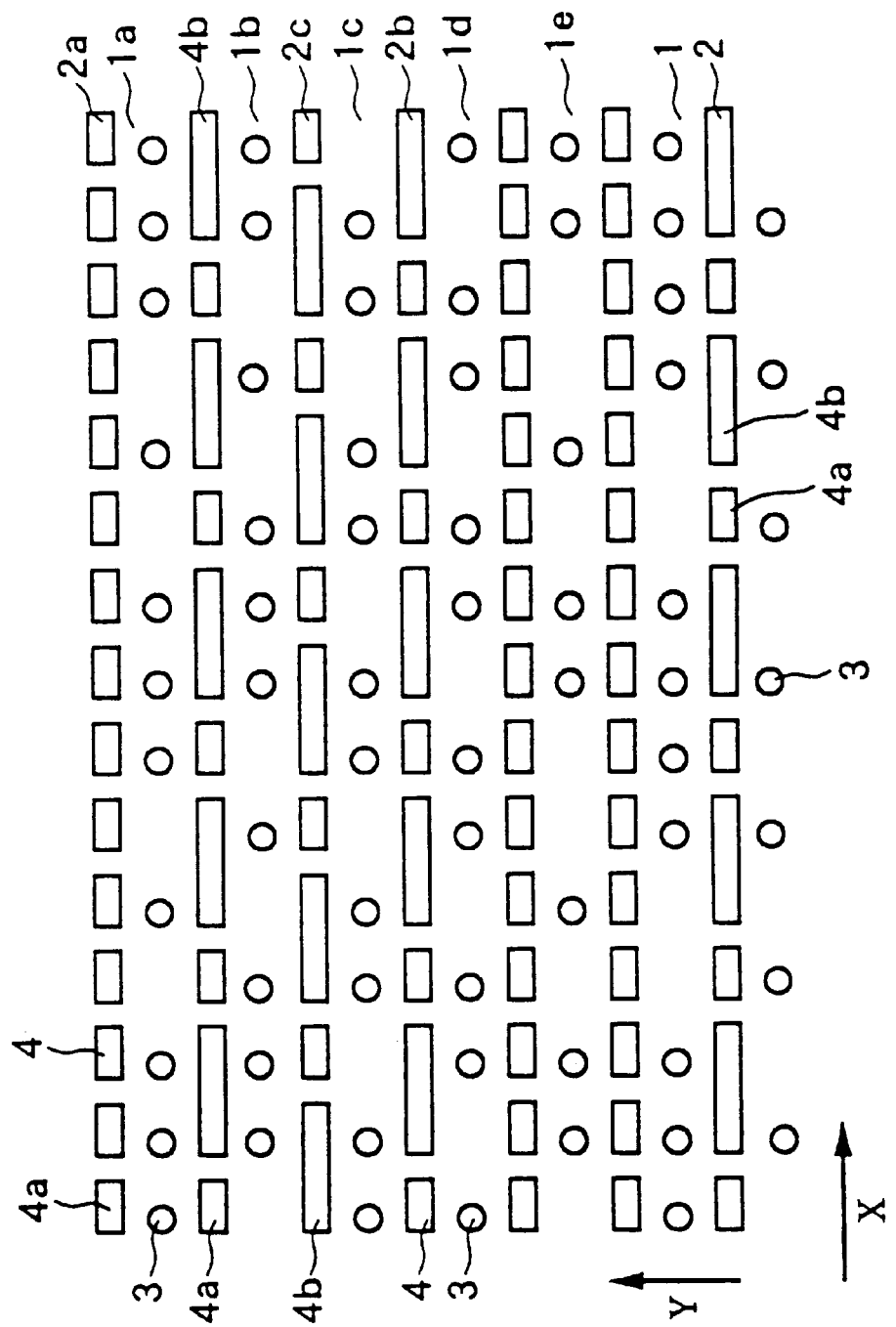
FIG. 1 is a diagram which serves to illustrate an embodiment of the track configuration of an optical memory card used in a method and device for controlling the tracking of an optical memory card to which the present invention pertains.

FIG. 1 is a diagram which serves to illustrate an embodiment of the track configuration of an optical memory card used in the method for controlling the tracking of an optical memory card and device for that purpose to which the present invention pertains.

The track configuration of the optical memory card illustrated in FIG. 1 is such that data recording tracks 1, which form recording pits 3, and guide tracks 2 are arranged alternately. The guide tracks 2 are not continuous as in the conventional device illustrated in FIG. 10, but are made up of rows each comprising a plurality of guide track segments 4.

Two types of guide track segment 4 are used, viz. a guide track segment 4a which is slightly shorter than the recording interval of the data recording track 1, and a guide track segment 4b which is slightly shorter than twice the recording interval of the data recording track 1. Repeated patterns formed by virtue of the arrangement of these guide track segments 4 consist of cycles of three recording interval lengths wherein three bits of data are recorded.

It will therefore be clear from the method of detecting track holding mistakes described below that provided the error correction capacity of the recording and reproduction device for the optical memory card is not less than three bits, it will be possible to correct track holding mistakes without any interruption to the process of scanning the recording area of the optical memory card.

There are three possible permutations of cycle of three recording interval lengths, namely guide track 2a, guide track 2b and guide track 2c, which with an interposed data recording track 1 yield nine combinations.

However, as will be evident from the method of detecting track holding mistakes which is described below, a data recording track 1 with guide tracks 2b on either side or with guide tracks 2c on either side does not allow a synchronizing signal to be extracted, so that it is impossible to use these configurations.

It will also be evident that where a data recording track is bordered on one side by a guide track 2a (e.g. as at the top of the drawing) and on the opposite side (center of the drawing) by a guide track 2b or 2c, the method of detecting track holding mistakes described below detects both as the same pattern, with the result that only one of them can be used.

This means that the maximum number of permutations of data recording track 1 interposed between guide tracks 2 which can be used is represented by the five data recording tracks 1a–1e illustrated in FIG. 1.

Figure 10A:
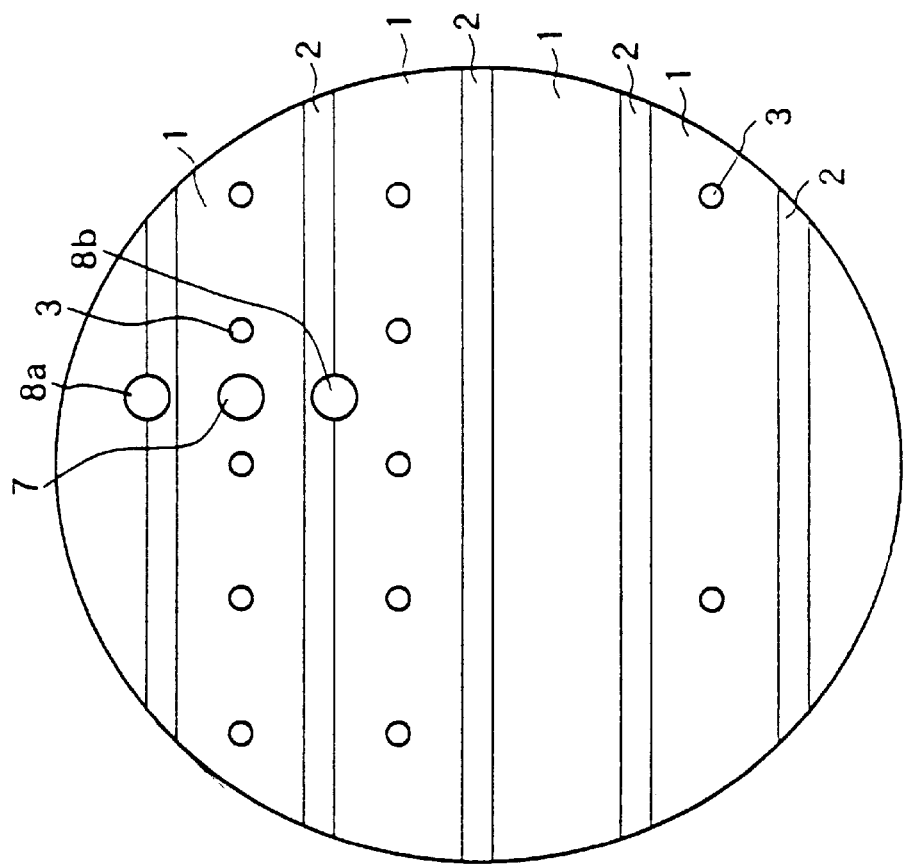
FIG. 10 is a diagram illustrating a track configuration in the recording area of a conventional optical memory card.
Figure 10:
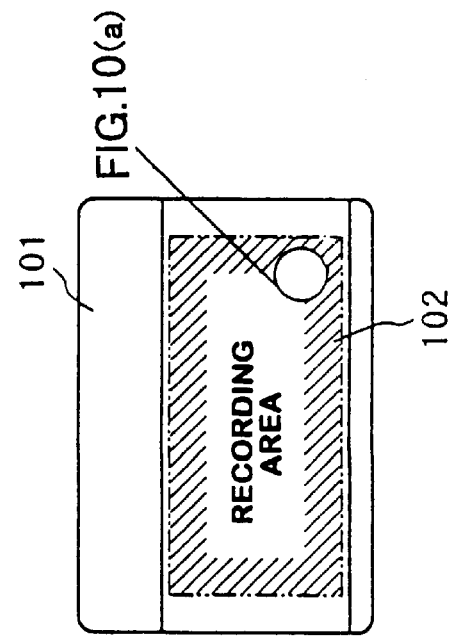
Figure 11:
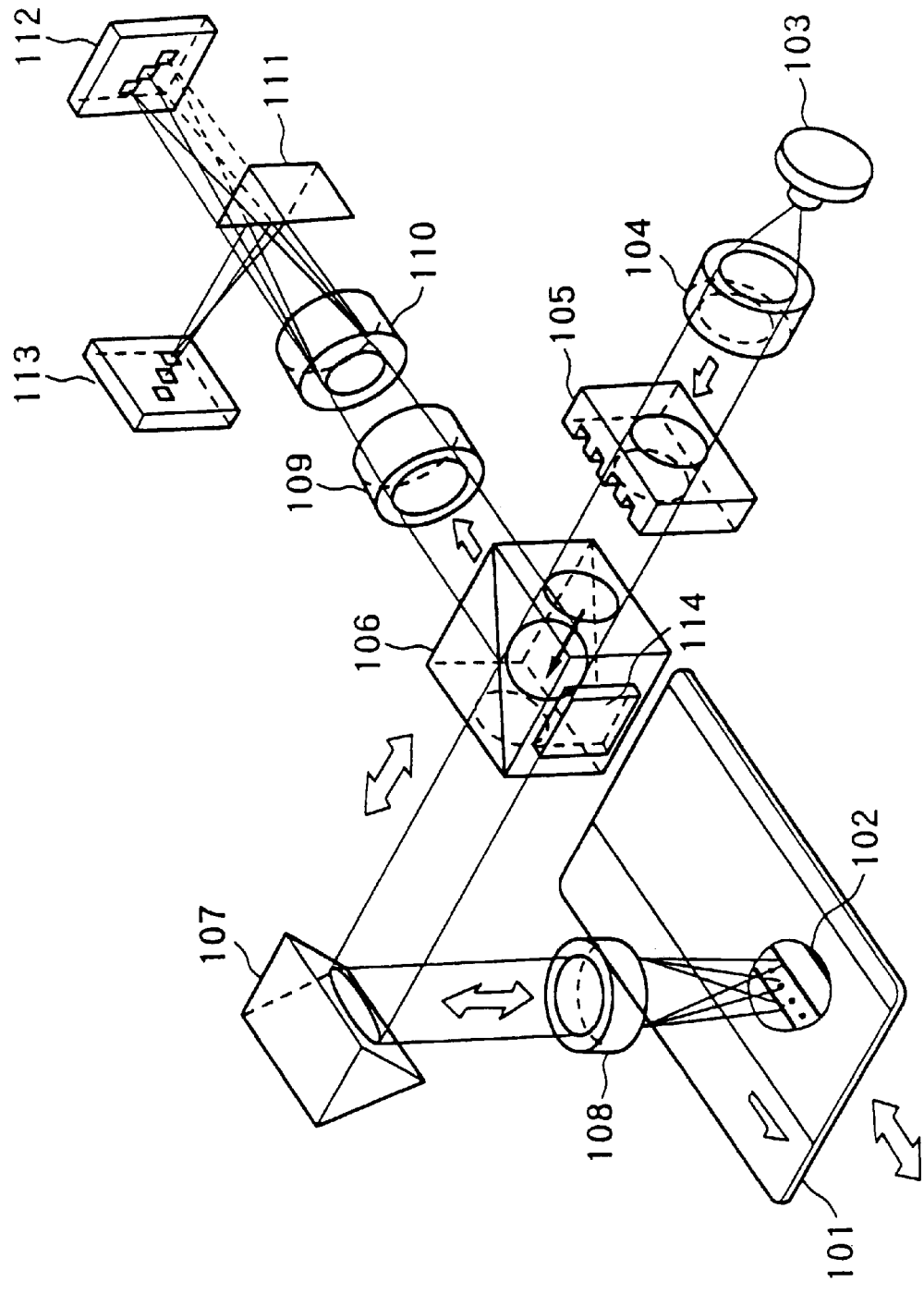
FIG. 11 is a diagram illustrating the configuration of an optical system which records and reproduces information for an optical memory card.
Figure 12:
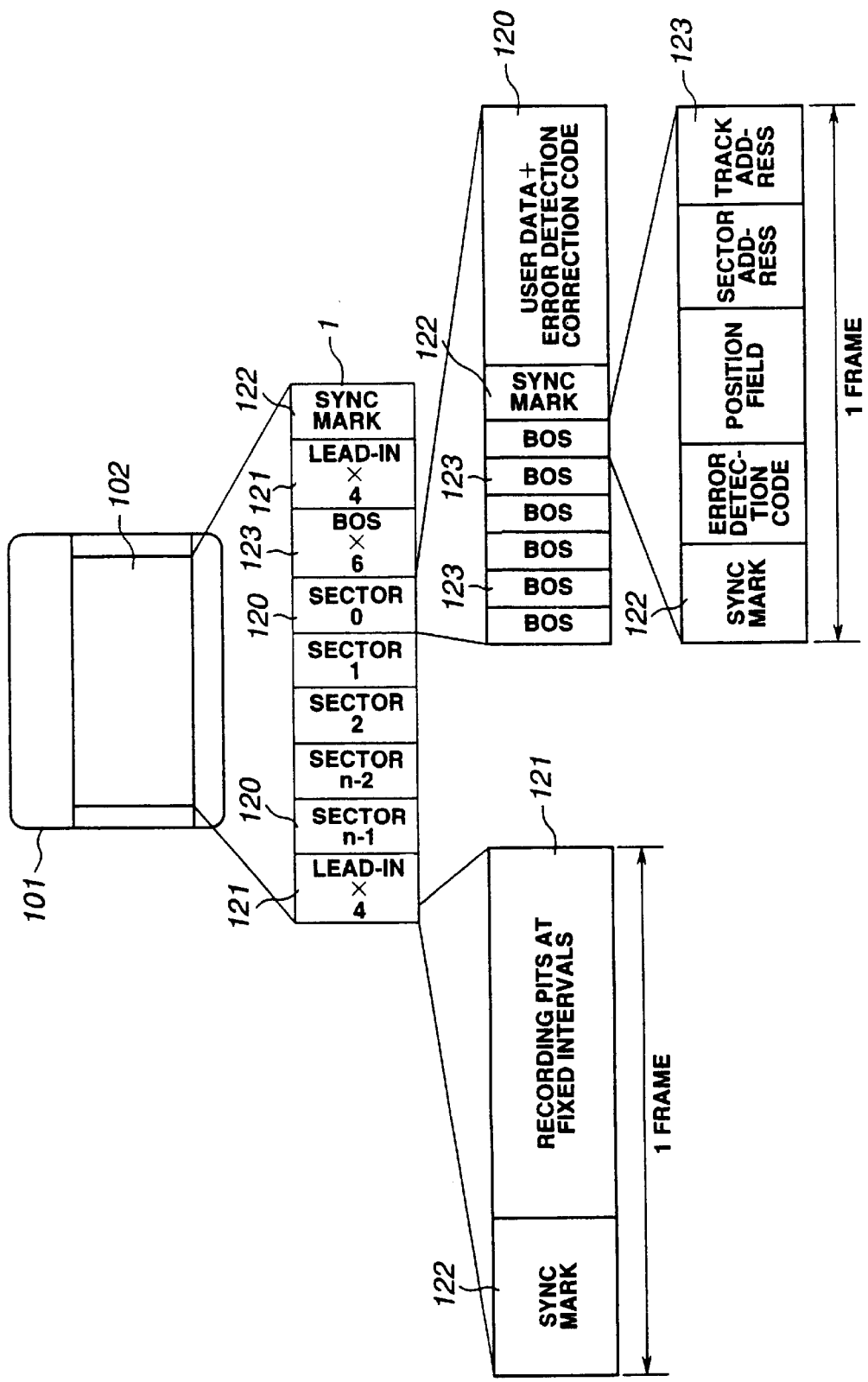
FIG. 12 is a diagram which illustrates a logical configuration of the conventional memory card.

Guide tracks 2 composed of guide track segments 4 in this manner are irradiated with sub-beam as depicted in FIG. 10, and the reflected beams detected with the aid of photosensors 112 and 113, thus allowing a tracking error signal, track holding signal and synchronizing signal to be extracted from the detection output.

Figure 2:
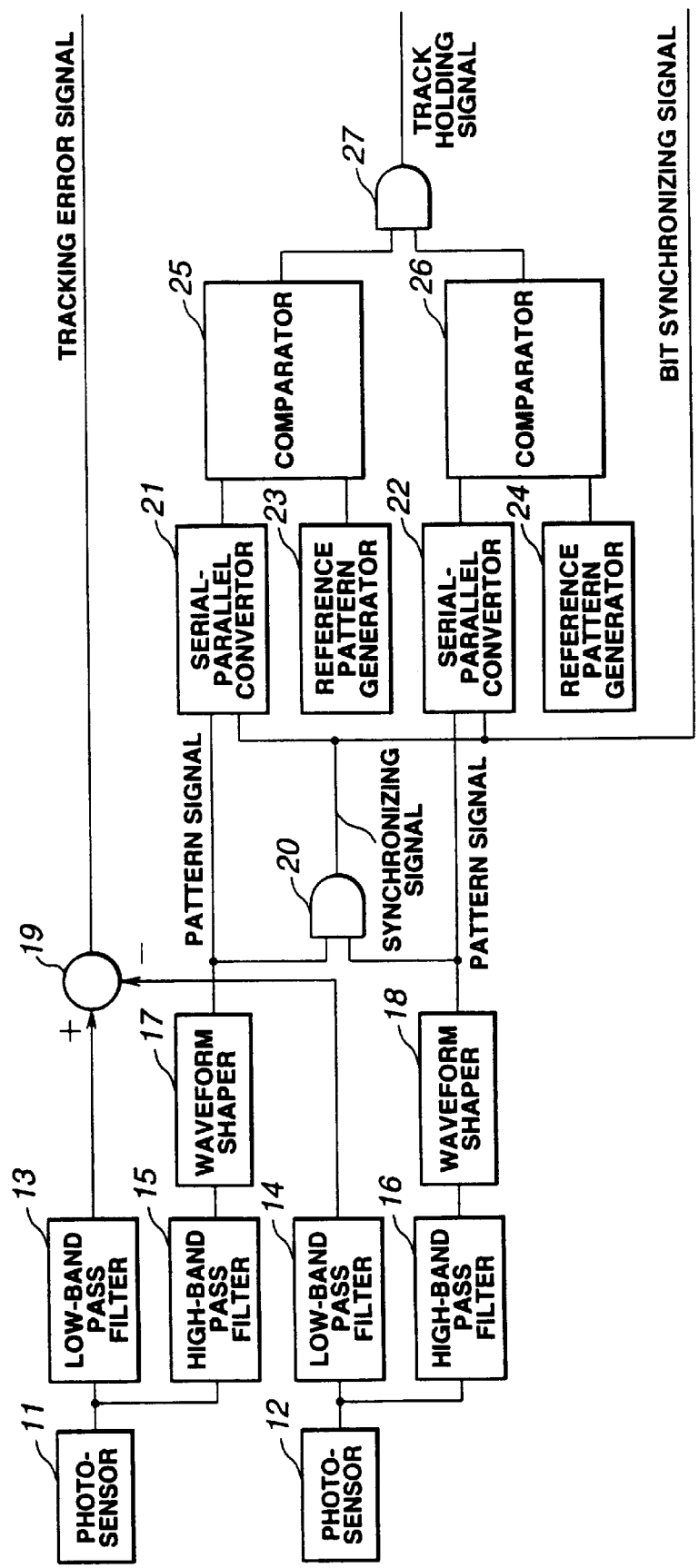
FIG. 2 is a schematic drawing depicting an embodiment of a circuit whereby a tracking error signal, track holding signal and bit synchronizing signal are extracted if the track configuration illustrated in FIG. 1 is adopted.

FIG. 2 is a schematic drawing depicting an embodiment of the circuit whereby the tracking error signal, track holding signal and synchronizing signal are extracted.

In FIG. 2, an photosensor 11 corresponds to the photosensor 112 illustrated in FIG. 10, while an photosensor 12 corresponds to the photosensor 113 illustrated in that drawing.

The output of the photosensor 11 is input to a low-band pass filter 13 and a high-band pass filter 15, allowing respectively the low-band frequency component and high-band frequency component of the photosensor 11 to be extracted.

Similarly, the output of the photosensor 12 is input to a low-band pass filter 14 and a high-band pass filter 16, allowing respectively the low-band frequency component and high-band frequency component of the photosensor 12 to be extracted.

The low-band frequency component of the output of the photosensor 11 extracted in the low-band pass filter 13 and the low-band frequency component of the output of the photosensor 12 extracted in the low-band pass filter 14 are input to a computing unit 19.

The computing unit 19 deducts the low-band frequency component of the output of the photosensor 12 extracted in the low-band pass filter 14 from the low-band frequency component of the output of the photosensor 11 extracted in the low-band pass filter 13, and outputs the result as a tracking error signal.

In other words, the fact that during scanning of the recording area of the optical memory card the optical head moves at high speed in the X direction means that by extracting the low-band frequency component of the output of the photosensor 11 in the low-band pass filter 13, and the low-band frequency component of the output of the photosensor 12 in the low-band pass filter 14, it is possible to extract signals independently of breaks between the guide track segments 4 of the guide tracks 2. This enables tracking control by means of a tracking error signal as in the conventional method.

Meanwhile, the high-band frequency component of the output of the photosensor 11 extracted in the high-band pass filter 15 and the high-band frequency component of the output of the photosensor 12 extracted in the high-band pass filter 16 each become signals wherein breaks between the guide track segments 4 of the guide tracks 2 have been detected.

The high-band frequency component of the output of the photosensor 11 extracted in the high-band pass filter 15 and the high-band frequency component of the output of the photosensor 12 extracted in the high-band pass filter 16 are shaped into square-wave signals in a waveform shaper 17 and waveform shaper 18 respectively before being input to an AND-gate 20.

Here, the arrangement of the guide track segments 4 of the guide tracks 2 is configured in such a manner that for each recording interval length of the data recording track 1 there is a break in at least one of the guide tracks 2 between which the data recording track 1 is interposed. Thus, it is possible to extract an initializing bit synchronizing signal from the AND-gate 20 for each such recording interval. Inasmuch as these bit synchronizing signals are independent of the scanning rate, it is possible to achieve correct bit synchronization during recording and reproduction in relation to the recording area of the optical memory card without improving the accuracy of the scanning rate.

The output of the waveform shapers 17 and 18 is input to serial-parallel converters 21 and 22.

The serial-parallel converters 21 and 22 convert the signals input from the waveform shapers 17 and 18 to parallel data with the aid of the synchronizing signals output from the AND-gate 20, and input them to comparators 25 and 26.

Meanwhile, for instance, a first standard pattern corresponding to the upper of the two guide tracks between which the scanned data recording track 1 is interposed is set in a standard pattern generator 23. The standard pattern generator 23 generates this first standard pattern as parallel data, and inputs it to the comparator 25.

Similarly, for instance, a second standard pattern corresponding to the lower of the two guide tracks between which the scanned data recording track 1 is interposed is set in a standard pattern generator 24. The standard pattern generator 24 generates this second standard pattern as parallel data, and inputs it to the comparator 26.

The comparator 25 compares the parallel data which has been converted in the serial-parallel converter 21 and the first standard pattern which has been generated by the standard pattern generator 23. If they match, it outputs a high-level signal. The output of the comparator 25 is input to an AND-gate 27.

Meanwhile, the comparator 26 compares the parallel data which has been converted in the serial-parallel converter 22 and the second standard pattern which has been generated by the standard pattern generator 24. If they match, it outputs a high-level signal. The output of the comparator 26 is input to the AND-gate 27.

The AND-gate 27 takes the logical product of the input signals and outputs it as a track holding signal.

In other words, if the input signals are both high-level, which is to say if the two guide tracks between which the scanned data recording track 1 is interposed match the first and second standard patterns respectively, a high-level track holding signal is output from the AND-gate 27 as indicating that the data recording track 1 is being scanned correctly.

If a track holding mistake occurs, a low-level signal is output from the AND-gate 27. If the track configuration of the card is like the one illustrated in FIG. 1, the arrangement of the guide track segments 4 is such that one cycle is equal to three recording interval lengths, and the pattern formed by the arrangement of the guide track segments 4 of the guide tracks 2 between which the data recording track 1 is interposed is repeated with five data recording tracks 1 as one cycle. This means that if the track holding mistake is within the range of five tracks, it can be detected during the time it takes to scan three recording intervals.

Figure 3:
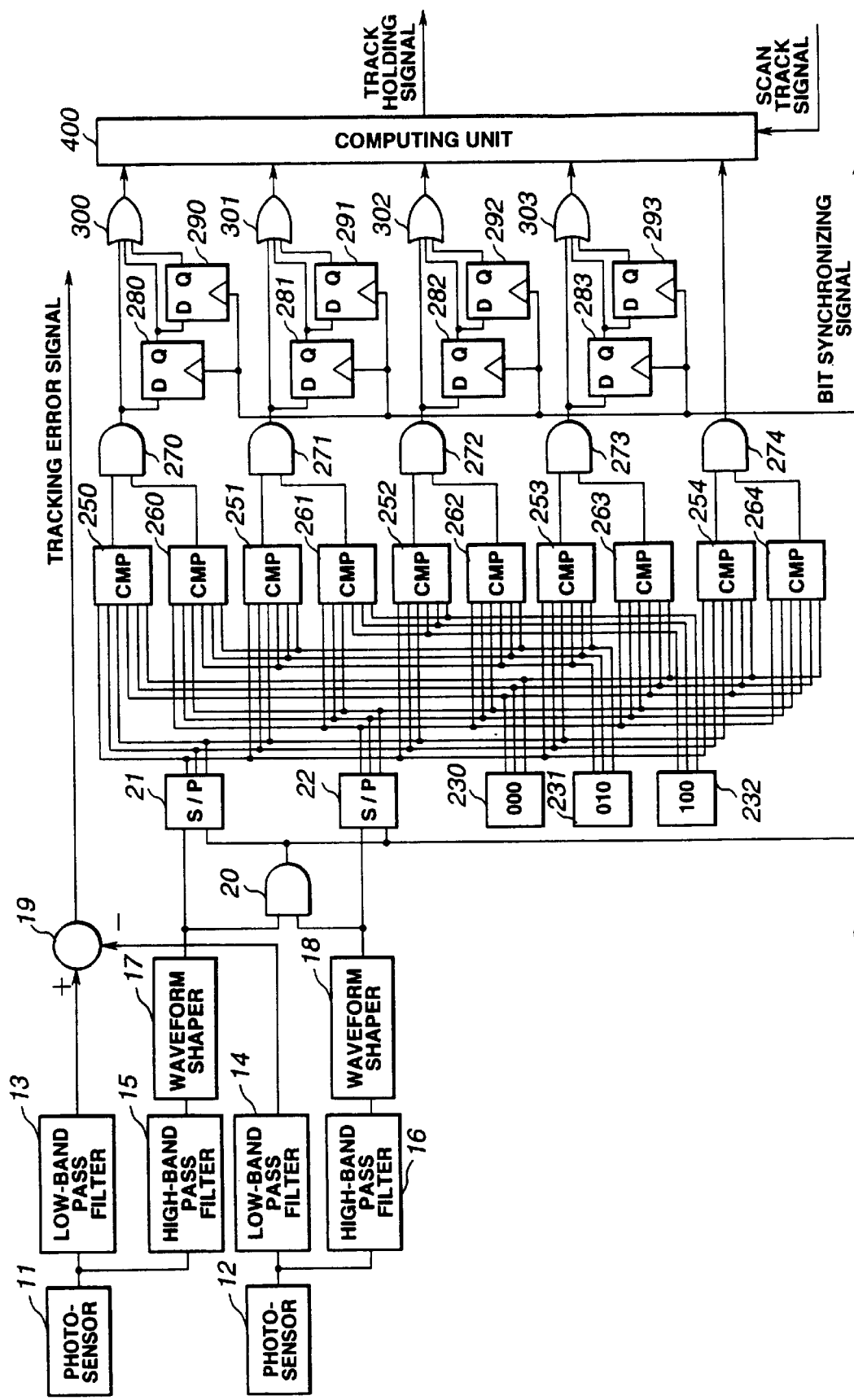
FIG. 3 is a schematic drawing depicting another embodiment of the circuit whereby the tracking error signal, track holding signal and bit synchronizing signal are extracted if the track configuration illustrated in FIG. 1 is adopted.
Figure 4A:
FIGS. 4(a) through 4(n) are timing charts of a part that extracts the synchronizing signal and track holding signal of the circuit illustrated in FIG. 3 which corresponds to a part of the track configuration shown in FIG. 1.
Figure 4B:
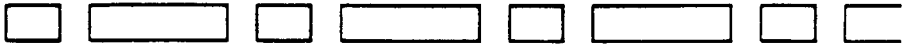
Figure 4C:
Figure 4D:
Figure 4E:
Figure 4F:
Figure 4G:
Figure 4H:
Figure 4I:
Figure 4J:
Figure 4K:
Figure 4L:
Figure 4M:
Figure 4N:
Figure 5A:
FIGS. 5(a) through 5(n) are timing charts of a part that extracts the synchronizing signal and track holding signal of the circuit illustrated in FIG. 3 which corresponds to another part of the track configuration shown in FIG. 1.
Figure 5B:
Figure 5C:
Figure 5D:
Figure 5E:
Figure 5F:
Figure 5G:
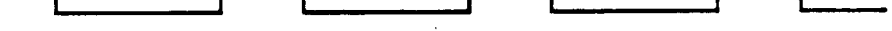
Figure 5H:
Figure 5I:
Figure 5J:
Figure 5K:
Figure 5L:
Figure 5M:
Figure 5N:

FIG. 3 is schematic drawing depicting another embodiment of the circuit whereby the tracking error signal, track holding signal and bit synchronizing signal are extracted.

The circuit illustrated in FIG. 3 is configured in such a manner as to output a track holding signal which shows not only whether or not the data recording track 1 is being scanned correctly, but also how many tracks the beam has slipped if it has migrated from the correct data recording track 1. In the configuration illustrated in FIG. 3, the tracking error signal and the synchronizing signal are extracted in the same manner as in FIG. 2.

The configuration illustrated in FIG. 3 differs from that of FIG. 2 in that it detects in addition which of five data recording tracks 1 is being scanned, and outputs on the basis of the relationship between the parallelly scanned data recording tracks 1 and the correct data recording track 1 a track holding signal which shows how many tracks the beam has slipped if it has migrated from the correct data recording track 1.

In FIG. 3, the output of the serial-parallel converter (S/P) 21, wherein the synchronizing signal output from the AND-gate 20 is used to convert the output of the waveform shaper 17 to parallel data, is input to comparators (CMP) 250, 251, 252, 253 and 254.

Similarly, the output of the serial-parallel converter (S/P) 22, wherein the synchronizing signal output from the AND-gate 20 is used to convert the output of the waveform shaper 18 to parallel data, is input to comparators (CMP) 260, 261, 262, 263 and 264.

Meanwhile, a digital code 000 representing a first pattern which corresponds to the guide track 2a of the guide tracks 2 illustrated in FIG. 1 is set in a standard pattern generator (000) 230, and the digital code 000 generated by this standard pattern generator 230 is input to the comparators 250, 254, 263 and 264.

Similarly, a digital code 010 representing a second pattern which corresponds to the guide track 2b of the guide tracks 2 illustrated in FIG. 1 is set in a standard pattern generator (010) 231, and the digital code 010 generated by this standard pattern generator 231 is input to the comparators 251, 253, 260 and 262.

In the same manner, a digital code 100 representing a third pattern which corresponds to the guide track 2c of the guide tracks 2 illustrated in FIG. 1 is set in a standard pattern generator (100) 232, and the digital code 100 generated by this standard pattern generator 232 is input to the comparators 252 and 261.

As has been explained above, there are five combinations of pattern of the guide tracks 2 between which the data recording track 1 is interposed, each with interposition of data recording tracks from 1a to 1e as illustrated in FIG. 1. In the circuit illustrated in FIG. 3, the comparators 250 and 260 together detect the combination of patterns corresponding to the data recording track 1a, while the comparators 251 and 261 together detect the combination of patterns corresponding to the data recording track 1b, the comparators 252 and 262 together detect the combination of patterns corresponding to the data recording track 1c, the comparators 253 and 263 together detect the combination of patterns corresponding to the data recording track 1d, and the comparators 254 and 264 together detect the combination of patterns corresponding to the data recording track 1e.

The pattern signals output from the serial-parallel converters 21 and 22, and corresponding to the pattern of the guide track 2a illustrated in FIG. 1 are always 000. If the signal generated by the standard pattern generator 230 corresponding to the guide track 2a is 000, and as a result the pattern detected by the comparators 250, 254, 263 and 264 is that of the guide track 2a, a high-level signal is always output.

Meanwhile, the pattern signals output from the serial-parallel converters 21 and 22, and corresponding to the pattern of the guide track 2b illustrated in FIG. 1 changes in the order 010, 100, 001 in synchronization with the synchronizing signal. If the signal generated by the standard pattern generator 231 corresponding to the guide track 2b is 010, and as a result the pattern detected by the comparators 251, 253, 260 and 262 is that of the guide track 2b, a high-level signal showing that the result of the comparison is the same is output for only one of three cycles of the synchronizing signal. Similarly, if the signal generated by the standard pattern generator 232 corresponding to the guide track 2c is 100, and as a result the pattern detected by the comparators 252 and 261 is that of the guide track 2c, a high-level signal showing that the result of the comparison is the same is output for only one of three cycles of the synchronizing signal.

In the same manner, the pattern signals output from the serial-parallel converters 21 and 22, and corresponding to the pattern of the guide track 2c illustrated in FIG. 1 changes in the order 100, 001, 010 in synchronization with the synchronizing signal. If the signal generated by the standard pattern generator 232 corresponding to the guide track 2c is 100, and as a result the pattern detected by the comparators 252 and 261 is that of the guide track 2c, a high-level signal showing that the result of the comparison is the same is output for only one of three cycles of the synchronizing signal. Similarly, if the signal generated by the standard pattern generator 231 corresponding to the guide track 2b is 010, and as a result the pattern detected by the comparators 251, 253, 260 and 262 is that of the guide track 2c, a high-level signal showing that the result of the comparison is the same is output for only one of three cycles of the synchronizing signal.

Consequently, if the photosensor 11 detects the pattern of the guide track 2a, a high-level signal is output from the comparators 250 and 254. If the photosensor 11 detects the pattern of the guide track 2b, a high-level signal is output from the comparators 251 and 253 for only one of three cycles of the synchronizing signal, while a similar signal to that output from the comparators 251 and 253 but with its phase staggered by one cycle of the synchronizing signal is output from the comparator 252. If the photosensor 11 detects the pattern of the guide track 2c, a high-level signal is output from the comparator 252 for only one of three cycles of the synchronizing signal, while a similar signal to that output from the comparator 252 but with its phase staggered by one cycle of the synchronizing signal is output from the comparators 251 and 253.

In the same manner, if the photosensor 12 detects the pattern of the guide track 2a, a high-level signal is output from the comparators 263 and 264. If the photosensor 12 detects the pattern of the guide track 2b, a high-level signal is output from the comparators 260 and 262 for only one of three cycles of the synchronizing signal, while a similar signal to that output from the comparators 260 and 262 but with its phase staggered by one cycle of the synchronizing signal is output from the comparator 261. If the photosensor 12 detects the pattern of the guide track 2c, a high-level signal is output from the comparator 261 for only one of three cycles of the synchronizing signal, while a similar signal to that output from the comparator 261 but with its phase staggered by one cycle of the synchronizing signal is output from the comparators 260 and 262.

Thus, when the data recording track 1a is scanned, a high-level signal is output for only one of three cycles of the synchronizing signal from an AND-gate 270, which outputs the logical product of the output of the comparator 250 and that of the comparator 260. Meanwhile, so long as the data recording track 1a is being scanned, a high-level signal is always output from an OR-gate 300, which outputs the logical sum of the output signal from the AND-gate 270, a signal wherein this output signal from the AND-gate 270 is delayed by one cycle of the synchronizing signal by virtue of a D flip-flop 280, and a signal wherein the output signal from the D flip-flop 280 is delayed by one cycle of the synchronizing signal by virtue of a D flip-flop 290.

Moreover, when the data recording track 1b is scanned, a high-level signal is output for only one of three cycles of the synchronizing signal from an AND-gate 271, which outputs the logical product of the output of the comparator 251 and that of the comparator 261. Meanwhile, so long as the data recording track 1b is being scanned, a high-level signal is always output from an OR-gate 301, which outputs the logical sum of the output signal from the AND-gate 271, a signal wherein this output signal from the AND-gate 271 is delayed by one cycle of the synchronizing signal by virtue of a D flip-flop 281, and a signal wherein the output signal from the D flip-flop 281 is delayed by one cycle of the synchronizing signal by virtue of a D flip-flop 291. However, the output of the comparator 252 and that of the comparator 262 are signals of a differing phase, and therefore so long as the data recording track 1b is being scanned, the output of an AND-gate 272, which outputs the logical sum of the two, is a low-level signal.

Similarly, when the data recording track 1c is scanned, a high-level signal is output for only one of three cycles of the synchronizing signal from the AND-gate 272, which outputs the logical product of the output of the comparator 252 and that of the comparator 262. Meanwhile, so long as the data recording track 1c is being scanned, a high-level signal is always output from an OR-gate 302, which outputs the logical sum of the output signal from the AND-gate 272, a signal wherein this output signal from the AND-gate 272 is delayed by one cycle of the synchronizing signal by virtue of a D flip-flop 282, and a signal wherein the output signal from the D flip-flop 282 is delayed by one cycle of the synchronizing signal by virtue of a D flip-flop 292. However, the output of the comparator 251 and that of the comparator 261 are signals of a differing phase, and therefore so long as the data recording track 1c is being scanned, the output of the AND-gate 271, which outputs the logical sum of the two, is a low-level signal.

In the same manner, when the data recording track 1d is scanned, a high-level signal is output for only one of three cycles of the synchronizing signal from an AND-gate 273, which outputs the logical product of the output of the comparator 253 and that of the comparator 263. Meanwhile, so long as the data recording track 1d is being scanned, a high-level signal is always output from an OR-gate 303, which outputs the logical sum of the output signal from the AND-gate 273, a signal wherein this output signal from the AND-gate 273 is delayed by one cycle of the synchronizing signal by virtue of a D flip-flop 283, and a signal wherein the output signal from the D flip-flop 283 is delayed by one cycle of the synchronizing signal by virtue of a D flip-flop 293.

Furthermore, when the data recording track 1e is scanned, a high-level signal is output, so long as the data recording track 1e is being scanned, from an AND-gate 274 which outputs the logical product of the output of the comparator 254 and that of the comparator 264.

FIGS. 4 and 5 are timing charts illustrating the detection of the synchronizing signal and guide track patterns.

FIG. 4 is a timing chart where the data recording track 1a is scanned. FIG. 4 (a) shows the patterns of arrangement of the guide track segments 4 which comprise the guide track 2a, while FIG. 4 (b) shows the patterns of arrangement of the guide track segments 4 which comprise the guide track 2b.

FIGS. 4 (c) and 4 (d) illustrate pattern signals corresponding to the guide tracks shown in FIGS. 4 (a) and (b) respectively after shaping in the waveform shapers 17 and 18.

Since the breaks in the guide tracks 2 have a higher reflection factor than the guide track segments 4, the output of the photosensors 11 and 12 is greater for the breaks. This is reversed during shaping in the waveform shapers 17 and 18, and therefore the pattern signals in FIGS. 4 (c) and 4 (d) are initializing square waveforms corresponding to the guide track segments 4.

FIG. 4 (e) illustrates the output of the AND-gate 20 into which the pattern signals illustrated in FIGS. 4 (c) and 4 (d) have been input.

The AND-gate 20 outputs a high-level signal only when both inputs are high level, and so outputs a square waveform signal, which becomes a bit synchronizing signal with the recording interval of the data recording track 1 as its cycle.

FIG. 4 (f) shows the output of the lower bits of the serial-parallel converter 21, FIG. 4 (g) that of the central bits, and FIG. 4 (h) that of the upper bits, from which it will be seen that the detection pattern of the guide track 2a is always 000.

FIG. 4 (i) shows the output of the lower bits of the serial-parallel converter 22, FIG. 4 (j) that of the central bits, and FIG. 4 (k) that of the upper bits, from which it will be seen that the detection pattern of the guide track 2b changes from 010 to 100 and 001 with each cycle of the synchronizing signal.

FIG. 4 (l) is the output of the AND-gate 270. It will be seen that a high-level signal is output when the output of the serial-parallel converter 21 is 000 (FIGS. 4 (f), 4 (g) and 4 (h) are all low level), and when the output of the serial-parallel converter 22 is 010 (FIG. 4 (i) is low level, FIG. 4 (j) high level, and FIG. 4 (k) low level). FIG. 4 (m) is FIG. 4 (l) delayed by one cycle of the synchronizing signal by virtue of the D flip-flop 280, while FIG. 4 (n) is FIG. 4 (m) delayed by one cycle of the synchronizing signal by virtue of the D flip-flop 290. It will be seen that taking the logical sum of FIGS. 4 (l), 4 (m) and 4 (n) always produces a high-level signal.

FIG. 5 is a timing chart where the data recording track 1b is scanned. FIG. 5 (a) shows the patterns of arrangement of the guide track segments 4 which comprise the guide track 2b, while FIG. 5 (b) shows the patterns of arrangement of the guide track segments 4 which comprise the guide track 2c.

FIGS. 5 (c) and 5 (d) illustrate pattern signals corresponding to the guide tracks shown in FIGS. 5 (a) and (b) respectively after shaping in the waveform shapers 17 and 18.

Since the breaks in the guide tracks 2 have a higher reflection factor than the guide track segments 4, the output of the photosensors 11 and 12 is greater for the breaks. This is reversed during shaping in the waveform shapers 17 and 18, and therefore the pattern signals in FIGS. 5 (c) and 5 (d) are initializing square waveforms corresponding to the guide track segments 4.

FIG. 5 (e) illustrates the output of the AND-gate 20 into which the pattern signals illustrated in FIGS. 5 (c) and 4 (d) have been input.

The AND-gate 20 outputs a high-level signal only when both inputs are high level, and so outputs a square waveform signal, which becomes a bit synchronizing signal with the recording interval of the data recording track 1 as its cycle.

FIG. 5 (f) shows the output of the lower bits of the serial-parallel converter 21, FIG. 5 (g) that of the central bits, and FIG. 5 (h) that of the upper bits, from which it will be seen that the detection pattern of the guide track 2b changes from 010 to 100 and 001 with each cycle of the synchronizing signal.

FIG. 5 (i) shows the output of the lower bits of the serial-parallel converter 22, FIG. 5 (j) that of the central bits, and FIG. 5 (k) that of the upper bits, from which it will be seen that the detection pattern of the guide track 2c changes from 100 to 001 and 010 with each cycle of the synchronizing signal, and the waveform is similar to the detection pattern of the guide track 2b with its phase staggered by one cycle of the synchronizing signal.

FIG. 5 (l) is the output of the AND-gate 271. It will be seen that a high-level signal is output when the output of the serial-parallel converter 21 is 010 (FIG. 5 (f) is low level, FIG. 5 (g) high level, and FIG. 5 (h) low level), and when the output of the serial-parallel converter 22 is 100 (FIG. 5 (i) is low level, FIG. 5 (j) low level, and FIG. 5 (k) high level). FIG. 5 (m) is FIG. 5 (l) delayed by one cycle of the synchronizing signal by virtue of the D flip-flop 280, while FIG. 5 (n) is FIG. 5 (m) delayed by one cycle of the synchronizing signal by virtue of the D flip-flop 290. It will be seen that taking the logical sum of FIGS. 5 (l), 5 (m) and 5 (n) always produces a high-level signal.

In other words, when the data recording track 1 is scanned, a high-level signal is output from one of the OR-gates 300, 301, 302 and 303, or the AND-gate 274 in accordance with the pattern formed by the arrangement of the guide track segments 4 of the guide tracks 2 between which the data recording track 1 is interposed, thus making it possible to check the data recording track which is being scanned.

The output of the OR-gates 300, 301, 302 and 303, and the AND-gate 274 is input to the computing unit 400.

A scan track signal denoting the data recording track 1 which it is desired to scan is input to the computing unit 400, and a track holding signal showing how many tracks the beam has migrated from the correct data recording track 1 is output on the basis of the output of the OR-gates 300, 301, 302 and 303, and the AND-gate 274, together with the scan track signal.

Figure 6:
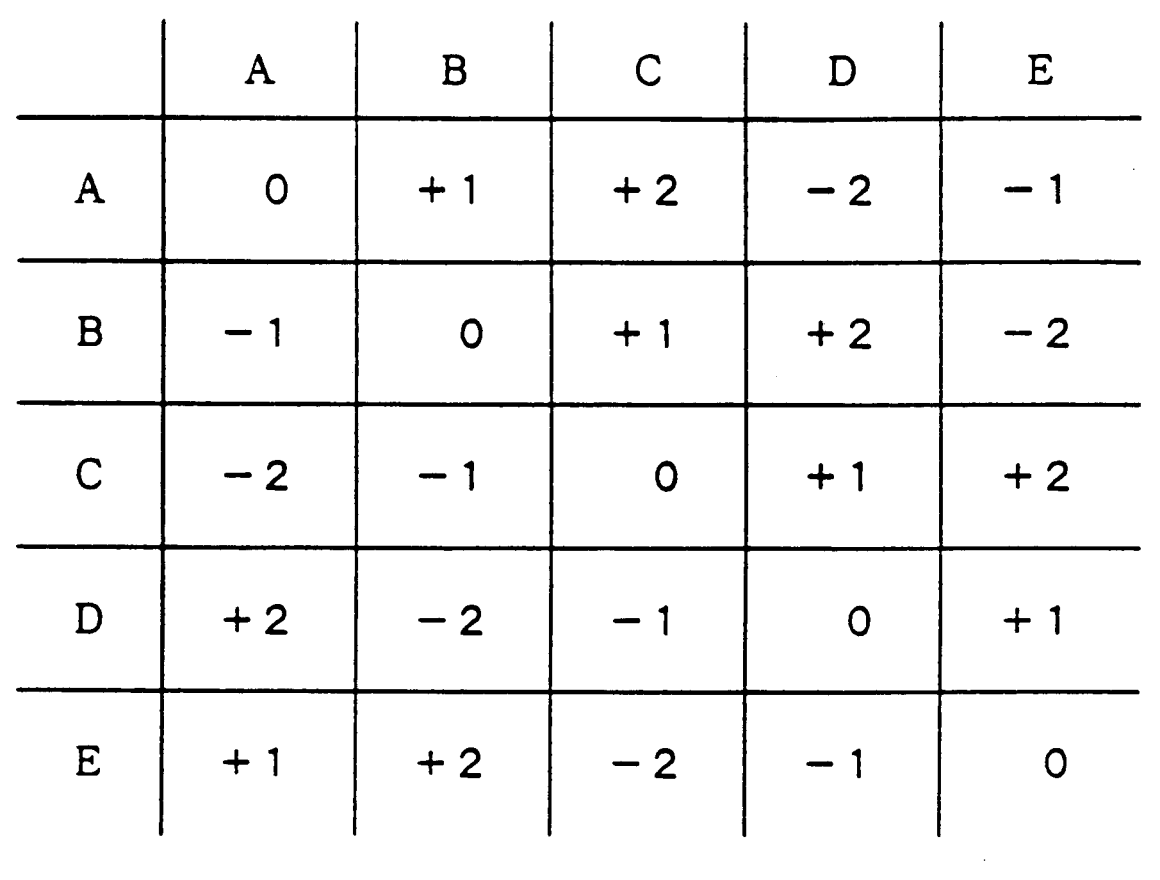

To be precise, the computing unit 400 may consist of a ROM in which a table as illustrated in FIG. 6 has been stored.

In the table illustrated in FIG. 6, the horizontal rows A–E represent the output of the OR-gates 300, 301, 302 and 303, and the AND-gate 274, while the vertical columns A–E represent the desired data recording tracks 1 which the scan track signal denotes. 0, +1, −1, +2 and −2 denote the difference between the data recording track 1 which it is desired to scan and the data recording track 1 which is actually being scanned.

Assuming, for example, that the data recording track 1 which it is desired to scan is the data recording track 1a, and this track is being scanned, the OR-gate 300 which corresponds to the data recording track 1a outputs a high-level signal, while the OR-gates 301, 302 and 303, and the AND-gate 274 which correspond to the data recording tracks 1b–1e output a low-level signal. The computing unit 400 outputs a track holding signal 0, which shows that it is the correct data recording track 1.

Suppose that a track holding mistake occurs in this state, and the data recording track 1 jumps from the data recording track 1a to the data recording track 1c. During the time which it takes for three bits of data to be reproduced (three recording intervals to be scanned), the output signal of the OR-gate 300 which corresponds to the data recording track 1a reverses to low level, while the output signal of the OR-gate 302 which corresponds to the data recording track 1c reverses to high level. As a result, a track holding signal −2 is output from the computing unit 400, showing that the beam has migrated two tracks downwards (in the negative direction on the Y axis in FIG. 1) from the correct data recording track.

In the device for recording and reproducing optical memory cards (not shown in the drawing), the beam is returned from the data recording track 1c to the correct data recording track 1a on the basis of this track holding signal −2.

Here, provided that the number of bits by which the device for recording and reproducing optical memory cards (not shown in the drawing) allows errors to be corrected is three or more, it is possible to correct three bits of error which have occurred as a result of a track holding mistake, thus allowing the device for recording and reproducing optical memory cards to continue scanning the data recording track 1a without interruption.

Assuming again, for example, that the data recording track 1 which it is desired to scan is the data recording track 1d, and this track is being scanned, the OR-gate 303 which corresponds to the data recording track 1d outputs a high-level signal, while the OR-gates 300, 301 and 302 which correspond to the data recording tracks 1a–1c, and the AND-gate 274 which corresponds to the data recording tracks 1e output a low-level signal. The computing unit 400 outputs a track holding signal 0, which shows that it is the correct data recording track 1.

Suppose that a track holding mistake occurs in this state, and the data recording track 1 jumps from the data recording track 1d to the data recording track 1b. During the time which it takes for three bits of data to be reproduced (three recording intervals to be scanned), the output signal of the OR-gate 303 which corresponds to the data recording track 1d reverses to low level, while the output signal of the OR-gate 301 which corresponds to the data recording track 1b reverses to high level. As a result, a track holding signal +2 is output from the computing unit 400, showing that the beam has migrated two tracks upwards (in the positive direction on the Y axis in FIG. 1) from the correct data recording track.

In the device for recording and reproducing optical memory cards (not shown in the drawing), the beam is returned from the data recording track 1b to the correct data recording track 1d on the basis of this track holding signal +2.

Here, provided that the number of bits by which the device for recording and reproducing optical memory cards (not shown in the drawing) allows errors to be corrected is three or more, it is possible to correct three bits of error which have occurred as a result of a track holding mistake, thus allowing the device for recording and reproducing optical memory cards to continue scanning the data recording track 1d without interruption.

Figure 7:
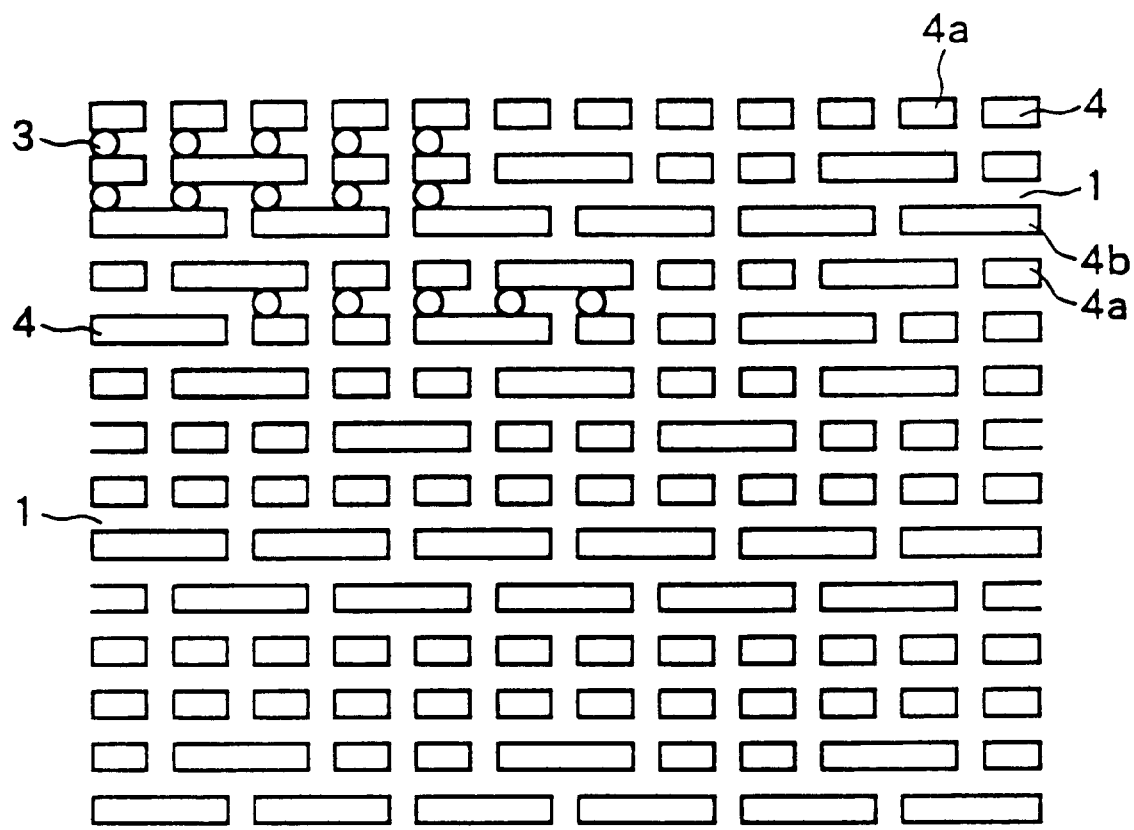
FIG. 7 is a diagram which serves to illustrate another embodiment of the track configuration of an optical memory card used in the method and device for controlling the tracking of an optical memory card to which the present invention pertains.
Figure 8:
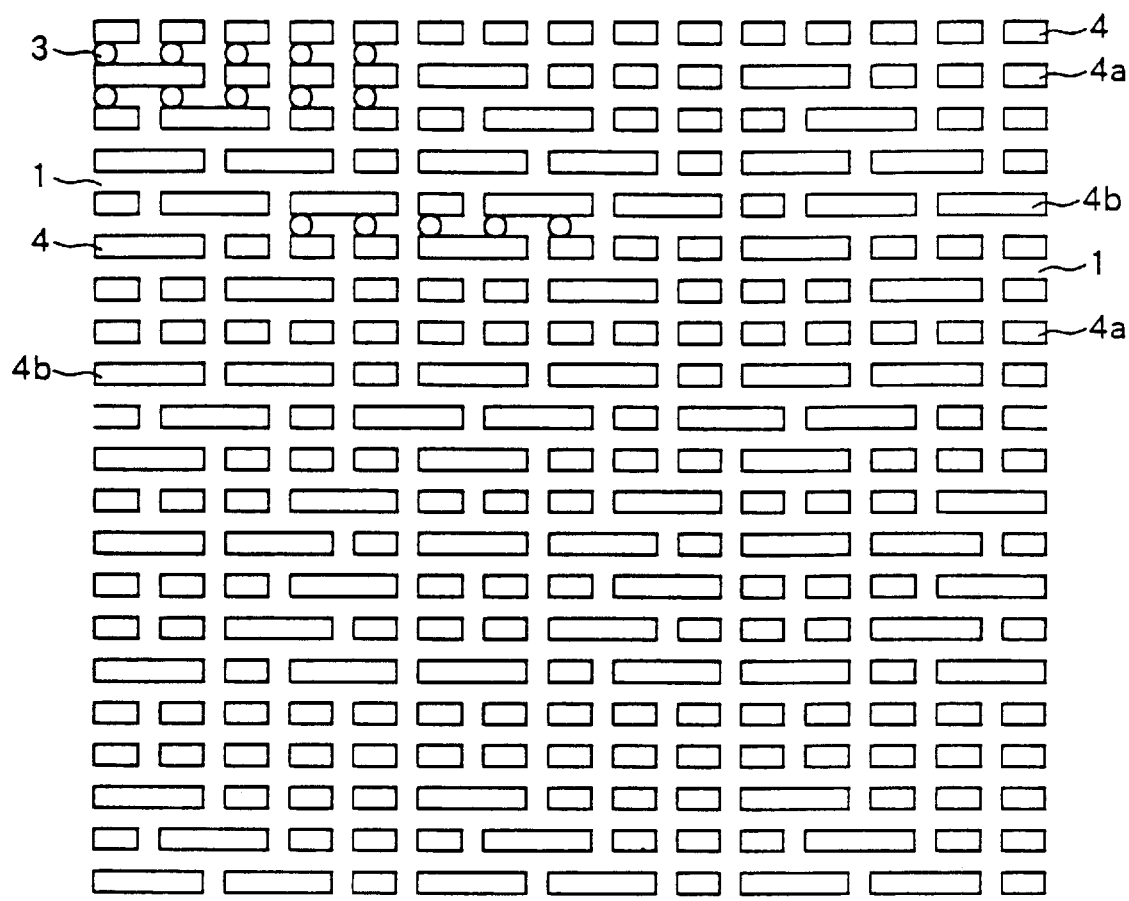
FIG. 8 is a diagram which serves to illustrate another embodiment of the track configuration of an optical memory card used in the method for controlling the tracking of an optical memory card and device for that purpose to which the present invention pertains.
Figure 9:
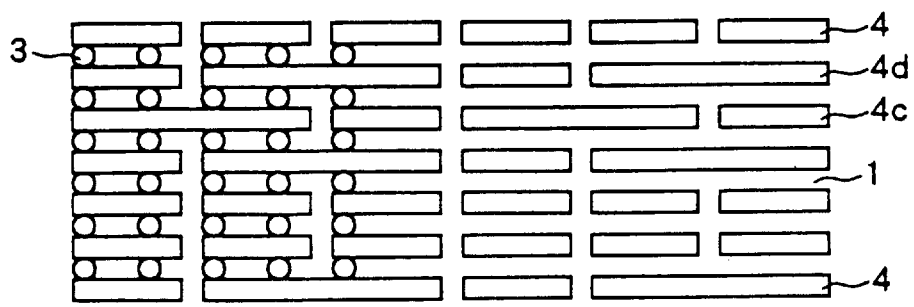
FIG. 9 is a diagram which serves to illustrate another embodiment of the track configuration of an optical memory card used in the method and device for controlling the tracking of an optical memory card to which the present invention pertains.

FIGS. 7–9 illustrate other examples of the track configuration shown in FIG. 1.

In FIG. 7, n=1, which is to say that it illustrates an example where the length of the guide tracks 4 is configured in such a manner that the guide track segments 4a are slightly shorter than the recording interval of the data recording track 1, while the guide track segments 4b are slightly shorter than twice the recording interval, the cycle of arrangement of the guide track segments 4 being the length of four recording intervals. In this example, the number of usable combinations of patterns formed by the arrangement of the guide track segments 4 of the guide tracks 2 between which the data recording track 1 is interposed is eleven, and the range within which it is possible to correct tracking hold mistakes is a maximum of eleven adjoining tracks.

In this case, the time required to detect the track holding mistake is within the time which the device for recording and reproducing optical memory cards (not shown in the drawing) takes to scan four recording intervals of the data recording track 1. Four bits are made to correspond to the serial-parallel converters 21 and 22 and the comparators 25 and 26, and it requires four or more bits which are capable of error correction.

In FIG. 8, n=1, which is to say that it illustrates an example where the length of the guide tracks 4 is configured in such a manner that the guide track segments 4a are slightly shorter than the recording interval of the data recording track 1, while the guide track segments 4b are slightly shorter than twice the recording interval, the cycle of arrangement of the guide track segments 4 being the length of five recording intervals. In this example, the number of usable combinations of patterns formed by the arrangement of the guide track segments 4 of the guide tracks 2 between which the data recording track 1 is interposed is seventeen, and the range within which it is possible to correct tracking hold mistakes is a maximum of seventeen adjoining tracks.

In this case, the time required to detect the track holding mistake is within the time which the device for recording and reproducing optical memory cards (not shown in the drawing) takes to scan five recording intervals of the data recording track 1. Five bits are made to correspond to the serial-parallel converters 21 and 22 and the comparators 25 and 26, and it requires five or more bits which are capable of error correction.

In FIG. 9, n=2, which is to say that it illustrates an example where the length of the guide tracks 4 is configured in such a manner that the guide track segments 4c are slightly shorter than twice the recording interval of the data recording track 1, while the guide track segments 4d are slightly shorter than quadruple the recording interval, the cycle of arrangement of the guide track segments 4 being the length of six recording intervals. In this example, the number of usable combinations of patterns formed by the arrangement of the guide track segments 4 of the guide tracks 2 between which the data recording track 1 is interposed is five, and the range within which it is possible to correct tracking hold mistakes is a maximum of five adjoining tracks.

In this case, the time required to detect the track holding mistake is within the time which the device for recording and reproducing optical memory cards (not shown in the drawing) takes to scan six recording intervals of the data recording track 1. Since the bit synchronizing signal which is obtained has a cycle of two bits, it is necessary to have a circuit which converts this signal into a bit synchronizing signal with a one-bit cycle.

INDUSTRIAL APPLICABILITY

In the present invention, data recording tracks for recording data, and guide tracks whereof the function is to guide the position of the laser beam used for recording and reproduction, are located alternately, and patterns are formed by the guide tracks, said patterns consisting of a combination of at least two types of guide track segment of a prescribed length synchronized with the recording interval in relation to the data recording tracks. This means that it is possible to extract a tracking error signal, track holding signal and bit synchronizing signal from the patterns which are detected by photosensors corresponding to the guide tracks. The tracking error sinal is used to control tracking and inhibit track holding mistakes, and the track holding signal to detect and correct track holding mistakes, thus preventing overwriting of data recording tracks which have already been recorded on, and inhibiting interruption of scanning resulting from track holding mistakes.

Moreover, inasmuch as the bit synchronizing signal is independent of the scanning rate of the device, the device can easily achieve bit synchronization, allowing the operation of recording and reproduction to be speeded up without improving the accuracy of the scanning rate.

Furthermore, inasmuch as the tracking error signal, track holding signal and bit synchronizing signal are independent of the modulation system, it is possible to adopt an efficient modulation system, while the fact that it is not necessary to record data on to the data recording track to achieve synchronization means that it is possible to contribute to the realization of a highly efficient optical memory card capable of high-speed operation.

What is claimed is:

1. An optical memory card characterized by having in a recording area data recording tracks for recording data and guide tracks formed on both sides of the data recording track in such a manner as to interpose the data recording track therebetween and having patterns comprised of a combination of at least two types of a guide track segment of a prescribed length synchronized with a recording interval in relation to the data recording tracks, a mutual combination of the patterns being different at least among the adjoining data recording tracks.

2. The optical memory card according to claim 1, wherein the patterns formed on the guide tracks comprise a combination of first guide track segments being slightly shorter than n times the recording interval and second guide track segments being slightly shorter than 2n times the recording interval.

3. The optical memory card according to claim 1, wherein the patterns formed on the guide tracks comprise patterns which are repeated in a cycle below that of the number of bits for which errors can be corrected in relation to the data recording tracks.

4. A method for controlling tracking of an optical memory card comprising the steps of:

forming, in a recording area of the optical memory card, data recording tracks for recording data and guide tracks on both sides of each data recording track in such a manner as to interpose the data recording track therebetween, the guide tracks having patterns comprised of at least two types of guide track segment of a prescribed length synchronized with a recording interval in relation to the data recording tracks, a mutual combination of the patterns being different at least among adjoining data recording tracks;

implementing tracking of the optical memory card on the basis of detection outputs of photosensors located in correspondence with the guide tracks;

extracting a synchronizing signal for recording and reproduction in relation to the data recording tracks by reading the patterns with the aid of photosensors; and detecting a track holding error in the data recording tracks on the basis of a read output of the patterns with the aid of the photosensors.

5. The method for controlling the tracking of an optical memory card according to claim 4, wherein identification of the data recording tracks is carried out on the basis of the read output of the patterns with the aid of the photosensors.

6. The method for controlling the tracking of an optical memory card according to claim 4, wherein the guide track segments of the prescribed length comprise first guide track segments which are slightly shorter than n times the recording interval, and second guide segments which are slightly shorter than 2n times the recording interval.

7. The method for controlling the tracking of an optical memory card according to claim 4, wherein the tracking of the optical memory card is implemented on the basis of a low-frequency component of the photosensor, and extraction of the synchronizing signal and identification of the tracks of the optical memory card are carried out on the basis of a high-frequency component of the photosensor.

8. The method for controlling the tracking of an optical memory card according to claim 5, wherein the patterns formed on the guide tracks comprise patterns which are repeated in a cycle below that of the number of bits for which errors can be corrected in relation to the data recording tracks, identification of the data recording tracks is carried out on the basis of combinations of patterns formed on two guide tracks between which the data recording track is interposed.

9. A device for controlling the tracking of an optical memory card having in a recording area alternately data recording tracks for recording data, and guide tracks for guiding a position of a laser beam used for recording and reproduction, wherein patterns are formed on the guide tracks, said patterns being comprised of a combination of at least two types of guide track segment of a prescribed length synchronized with a recording interval in relation to the data recording tracks, and the tracking of the optical memory card is implemented on the basis of detection outputs of a first photosensor and a second photosensor located in correspondence with two guide tracks between which the data recording track is interposed, characterized in that the device comprises:

a first low-band pass filter which serves to extract a low-band frequency component from a detection output of the first photosensor;

a first high-band pass filter which serves to extract a high-band frequency component from the detection output of the first photosensor;

a second low-band pass filter which serves to extract a low-band frequency component from a detection output of the second photosensor;

a second high-band pass filter which serves to extract a high-band frequency component from the detection output of the second photosensor;

tracking control means for carrying out the tracking of the optical memory card on the basis of a difference between the detection output of the first low-band pass filter and that of the second low-band pass filter;

an AND-circuit for extracting a synchronizing signal for recording and reproduction in relation to the data recording track on the basis of a logical product of the detection output of the first high-band pass filter and that of the second high-band pass filter;

a first comparative circuit for comparing the detection output of the first high-band pass filter with a prescribed first reference pattern;

a second comparative circuit for comparing the detection output of the second high-band pass filter with a prescribed second reference pattern; and identification means for identifying the data recording track on the basis of comparative outputs of the first and second comparative circuits.

10. The device for controlling the tracking of an optical memory card according to claim 9, wherein the patterns formed on the guide tracks comprise a combination of first guide track segments being slightly shorter than n times the recording interval and second guide track segments being slightly shorter than 2n times the recording interval, and a combination of the pattern formed in the two guide tracks between which the data recording track is interposed differs at least among adjoining data recording tracks.

11. The device for controlling the tracking of an optical memory card according to claim 9, wherein the patterns formed on the guide tracks comprise patterns which are repeated in a cycle below that of the number of bits for which errors can be corrected in relation to the data recording tracks.

* * * * *